United States Patent [19]

Dessens

[11] 4,405,675

[45] Sep. 20, 1983

[54] PANELBOARD WITH FRICTION SURFACE

[75] Inventor: Jan A. H. Dessens, Saskatchewan, Canada

[73] Assignee: MacMillan Bloedel Limited, Vancouver, Canada

[21] Appl. No.: 379,258

[22] Filed: May 17, 1982

[51] Int. Cl.³ .................................... B29J 5/00

[52] U.S. Cl. .................................... 428/156; 264/119

[58] Field of Search .................... 264/119; 428/156

[56] References Cited

U.S. PATENT DOCUMENTS 2,606,855 8/1952 Jenkins .................... 156/219
2,660,548 11/1953 Soehner .................... 156/219
4,248,163 2/1981 Caughey et al. .................... 264/119

FOREIGN PATENT DOCUMENTS 515400 8/1955 Canada .
786303 5/1968 Canada .
901947 6/1972 Canada .
920934 2/1973 Canada .
1060768 8/1979 Canada .

*Primary Examiner*—James R. Hall
*Attorney, Agent, or Firm*—Schuyler, Banner, Birch, McKie & Beckett

[57] ABSTRACT

A waferboard panel is disclosed and a method of making the panel having a friction surface on at least one side. The friction surface retains the water resistant properties of the panel surface and allows a firm footing when the panel is used in sloped roofs. The waferboard panel has at least one surface being a friction surface comprising a plurality of raised protrusions spaced apart in a predetermined pattern. The process of making the panel comprises the steps of assembling wood wafers coated with an adhesive binder into a mat with a plate, the plate having a surface adjacent the mat with a plurality of indentations or holes therein in a predetermined pattern, and pressing the mat in a press at a high temperature with the plate adjacent the mat to form the wafers into a waferboard panel such that the friction surface of the waferboard panel has a plurality of raised protrusions spaced apart in a predetermined pattern.

7 Claims, 4 Drawing Figures

PANELBOARD WITH FRICTION SURFACE

This invention relates to panelboard. More specifically, the invention relates to a friction surface on a waferboard.

The term waferboard is used here to denote a panelboard manufactured from wood wafers coated with an adhesive binder, assembled into mats, and pressed at high temperature to consolidate the wafers and set the adhesive. For convenience of manufacture the wafers are generally of a thickness in the range 0.010" to 0.050', of a width in the range ⅛" to 1½", and of a length in the grain direction at least 1". The majority of waferboard produced today have a somewhat slippery surface and this is found undesirable, particularly in roofing applications. In the construction of sloped roofs, workers find it difficult to retain a firm footing on the slippery surface of sloping boards.

To overcome this problem of slippery surface, waferboards are sometimes subjected to a scuffing process using a sanding belt. This greatly increases the friction and helps to eliminate the slippery surface on the board. However, there are two disadvantages associated with this scuffing process. First, it requires an additional production step which is time consuming and costly, and second the scuffing process removes the outer surface of the waferboard which contains cured resin and wax and is somewhat hardened giving water resistant properties to the surface. After scuffing the surface absorbs water more easily which is an undesirable feature particularly when the waferboard is used in exterior applications.

In another waferboard product, indentations are formed in the surface of the board by using a metal mesh or screen at the time of forming the waferboard in a press. Such a surface does not provide a satisfactory friction surface because the main surface of the board does not prevent slipping. Also, the indentations tend to collect water which is undesirable.

In the production of waferboard a mat of wafers coated with an adhesive binder is generally placed on a caul plate and transported into a press. Caul plates are usually made of steel, approximately ⅛" thick and generally have a length and breadth somewhat greater than the corresponding dimensions of the waferboard panel. In some instances a second caul plate is placed on top of the wafer mat to prevent displacement of wafers prior to pressing, and to compress the wafers somewhat thus reducng the thickness of the mat making it easier to insert the wafer mat into the press opening.

In other instances the second caul plate or top caul plate is not used and a separate plate is attached to the bottom of the hot platen in the press and thus remains in the press. In this case only the bottom caul plate is used to form and transport the wafer mat.

It has been found that by providing a plate with a pattern of indentations or small holes, either partially or fully through the plate, the pressing step causes the wafer mat to protrude slightly into these indentations or holes so that the final waferboard panel has a plurality of slightly raised protrusions corresponding to the pattern of indentations or holes in the caul plate. The presence of these protrusions on the surface of the waferboard increases the surface friction of the board when the board is wet or dry and allows a firm footing on sloped waferboards in some cases even up to slopes of 40°.

Furthermore a pattern of protrusions can be selected such that rows of protrusions are used for carpenters as nailing guides in the installation of the board.

The present invention provides a waferboard panel with at least one surface being a friction surface comprising a plurality of raised protrusions spaced apart in a predetermined pattern. In various embodiments the protrusions are substantially similar in shape, substantially round, and have a domed top. In some cases at least some broken or dislocated wood fibers appear on the surface of the protrusions.

In one embodiment, the panel is rectangular in shape, and the predetermined pattern has raised protrusions in lines parallel to sides of the panel and in lines at about 60° to ends of the panel. In another embodiment the protrusions are about 5/32" in diameter and are spaced apart about 7/16" from center to center, and in another embodiment the protrusions are about 3/16" in diameter and spaced apart about ½" from center to center. It is preferred that the protrusions be spaced apart at a distance between adjacent peripheries at least equal to the width of the protrusion.

Friction surfaces may be provided on one side or both sides of the panel and it is preferred that the protrusions be raised at least about 0.01 of an inch above the surface of the panel to obtain a good friction surface.

The present invention also provides a process for producing a waferboard having at least one friction surface, comprising the steps of, assembling wood wafers coated with an adhesive binder into a mat with a plate, the plate having a surface adjacent the mat with a plurality of indentations or holes therein in a predetermined pattern, and pressing the mat in a press at high temperature with the plate adjacent the mat to form the wafers into a waferboard panel, such that the friction surface of the waferboard panel has a plurality of raised protrusions spaced apart in a predetermined pattern.

In one embodiment the plate is a caul plate with a flat surface and is positioned under the mat of wafers. If a top caul plate is used, the plurality of indentations may be in either top or bottom plate, or if friction surfaces are required on both sides, then in both plates. In another embodiment, the plate is attached to a platen of the press and remains in the press.

In drawings which illustrate embodiments of the invention,

Figure 1:
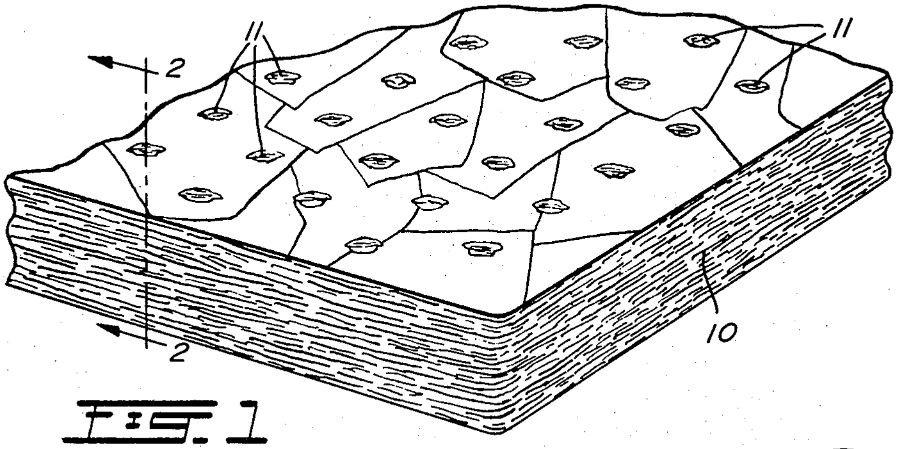
FIG. 1 is a partial isometric view of one embodiment of the invention, illustrating a waferboard with a pattern of protrusions giving a friction surface.
Figure 2:
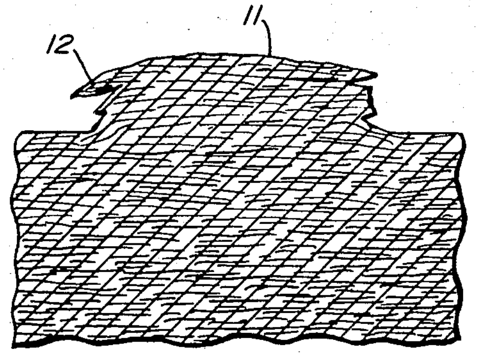
FIG. 2 is a sectional view of the waferboard taken at line 2,2 of FIG. 1.

A portion of waferboard 10 is illustrated in FIGS. 1 and 2 which has on one surface a series of raised protrusions 11 in a predetermined pattern. The protrusions 11 are substantially round and similar in shape. They are formed on the waferboard during the heating and curing step. Each protrusion 11, as illustrated in FIG. 2, has a domed top, and some may have broken or dislocated wood fibers 12 showing. The panel surface perimeter of the protrusions conforms approximately to the shape of the holes or indentations in the plate but the height and shape of the protrusions 11 may vary. The panel surface perimeter of the protrusions may be round oval, elongated or any other desired shape. The space between peripheries or adjacent protrusions 11 is preferably at least equal to the width of the protrusion 11.

Figure 3:
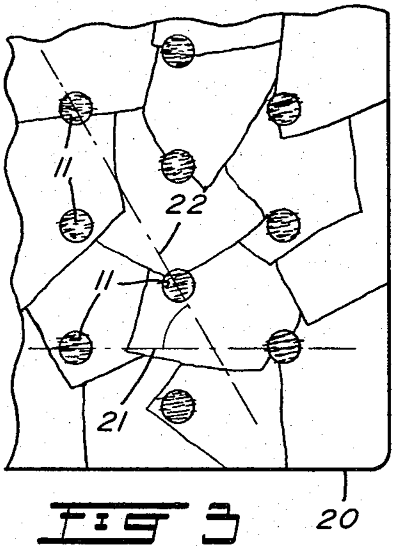
FIG. 3 is a plan view showing one pattern on a rectangular panel.

A satisfactory pattern for protrusions 11 is shown in FIG. 3 wherein a rectangular waferboard panel 20 has lines 21 of protrusions 11 parallel to the sides of the panel and lines 22 at approximately 60° to the end of the panel 20. In one embodiment the protrusions 11 are about 5/32" diameter on the surface of the panel 20 and are spaced apart about 7/16" from center to center. In this embodiment the top of each protrusion is approximately 0.015" above the surface of the panel. In another embodiment the protrusions 11 are about 3/16" diameter on the surface of the panel 20 and spaced apart about ½" from center to center. It has been found that these last patterns provide a good nailing guide for carpenters when applying waferboard panels to roofs and walls.

Friction tests were carried out with a waferboard having a friction surface similar to that shown in FIG. 3. The friction surface was compared to a waferboard with a scuffed flat surface. The tests were performed by a person weighing 170 lb attempting to walk up and down a waferboard panel supported on a frame with the incline being raised by increments of 2.5° for each test until safe footing was no longer achieved. The person wore size 7 shoes with a surface area of 21 square inches. Three different types of shoe sole were used, the hardness of each being measured with a hardness tester. Three different board surface conditions were used, dry, dry sprinkled with sawdust and wet after being sprinkled with sawdust. The results are illustrated in the following table.

| | | Maximum Angle of Incline for Secure Foothold | | |
|---|---|---|---|---|
| | | Leather Sole | Rubber Sole | |
| Board Type | Surface Condition | 90 Durometer | 80 Durometer | 45 Durometer |
| Friction Surface Board | Dry | 21 | 37.5 | 40 |
| Scuffed Board | Dry | 17.5 | 30 | 32.5 |
| Friction Surface Board | Dry With Sawdust* | — | 30 | 32.5 |
| Scuffed Board | Dry With Sawdust* | — | 17.5 | 20 |
| Friction Surface Board | Wet | 25 | 35 | 40 |
| Scuffed Board | Wet | 20 | 32.5 | 35 |

*No significant difference occurred between sawdust being freshly applied and mostly brushed off.

Figure 4:
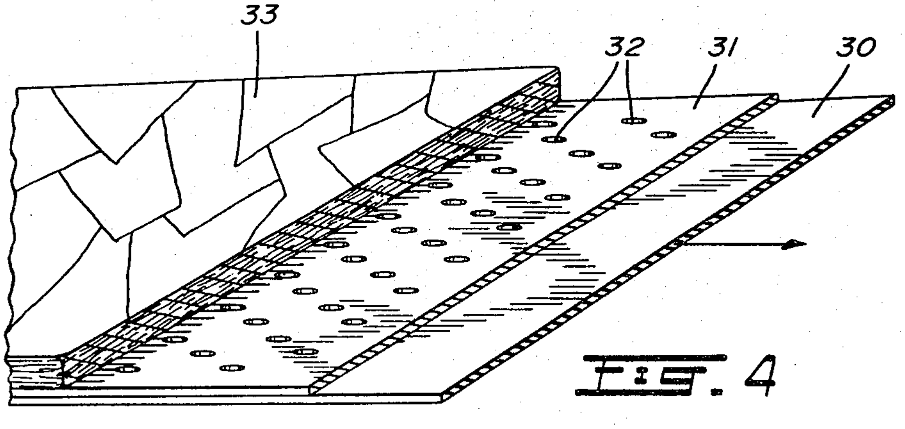
FIG. 4 is an isometric view of one method of producing a waferboard with a friction surface.

The preparation of waferboard with one friction surface is illustrated in FIG. 4. This process is one of many that may be used to produce the friction surface. A moving belt 30 is shown having a caul plate 31 sitting thereon. The caul plate has a pattern of holes 32 across the top surface. For ease of cleaning these holes 32 preferably pass through the caul plate 31, but satisfactory protrusions can be made if indentations are used instead of holes. A wafer mat 33 comprising wood wafers coated with resin and generally also with wax is laid on the caul plate 31. Once the mat is complete the caul plate 31 advances to a press (not shown) where heat and pressure are applied to cure the resin in the wafer mat to form the board. Protrusions in the board occur where the holes or indentations are located in the caul plate.

In some instances a top caul plate is laid on top of the wafer mat 33 for certain processing advantages. This allows the top caul plate to be perforated to provide the friction surface on the top of the board instead of the bottom, or in some instances, both top and bottom caul plates are perforated thus providing friction surfaces on both sides of the panel.

In another embodiment a plate with a pattern of holes or indentations may be fixed to the top platen in the press so that the plate remains in the press. No other top caul plate is used, and the bottom caul plate may be perforated or smooth depending whether the waferboard panel is to have one or two friction surfaces.

The embodiments of the invention in which an exclusive property or privilege is claimed are defined as follows:

1. A process for producing a waferboard panel having at least one friction surface, comprising the steps of assembling wood wafers coated with an adhesive binder into a mat with a plate, the plate having a surface adjacent the mat with a plurality of indentations or holes therein in a predetermined pattern, and pressing the mat in a press at a high temperature with the plate adjacent the mat to form the wafers into a waferboard panel such that the friction surface of the waferboard panel has a plurality of raised protrusions spaced apart in a predetermined pattern.

2. The process according to claim 1 wherein the plate is a caul plate with a flat surface and is positioned under the mat of wafers.

3. The process according to claim 1 wherein the mat of wafers is assembled on a first caul plate having no indentations or holes therein, and a second caul plate is placed on the mat prior to the mat entering the press, the second caul plate having a surface adjacent the mat with a plurality of indentations or holes therein in a predetermined pattern.

4. The process according to claim 1 wherein the mat of wafers is assembled on a first caul plate having a surface adjacent the mat with a plurality of indentations or holes therein in a predetermined pattern, and a second caul plate is placed on the mat prior to the mat entering the press, the second caul plate having a surface adjacent the mat with a plurality of indentations or holes therein in a predetermined pattern, such that the resulting waferboard panel has a friction surface on both sides.

5. The process according to claim 1 wherein the plate is attached to a platen of the press and remains in the press.

6. The process according to any one of claims 1, 2, 3 or 4 wherein the indentations or holes are round, substantially the same size and in a regular pattern such that the spaces between adjacent peripheries of the indentations or holes are at least equal to the diameter of the indentations or holes.

7. A waferboard panel produced according to the process of claim 1.

* * * * *